United States Patent [19]
Farr

[11] Patent Number: 4,655,513
[45] Date of Patent: Apr. 7, 1987

[54] ANTI-SKID HYDRAULIC BRAKING SYSTEMS FOR VEHICLES

[75] Inventor: Glyn P. R. Farr, Warwickshire, England

[73] Assignee: Lucas Industries Public Limited Company, England

[21] Appl. No.: 750,883

[22] Filed: Jul. 1, 1985

[30] Foreign Application Priority Data

Jul. 4, 1984 [GB] United Kingdom ............... 8416991

[51] Int. Cl.⁴ ............................................. B60T 8/02
[52] U.S. Cl. ............................ 303/115; 188/181 A; 303/116; 303/119
[58] Field of Search ............... 303/115, 116, 119, 117, 303/113, 111, 10–12, 6 A, 59, 68–69, 61–63; 188/181 A, 181 R

[56] References Cited

U.S. PATENT DOCUMENTS

4,340,258  7/1982  Farr ................................. 303/116 X
4,547,022  10/1985  Brearley et al. ................. 303/116 X

FOREIGN PATENT DOCUMENTS

2090929  7/1982  United Kingdom .
2101246  1/1983  United Kingdom .

*Primary Examiner*—Douglas C. Butler
*Attorney, Agent, or Firm*—Laff, Whitesel, Conte & Saret

[57] ABSTRACT

In an anti-skid braking system of the de-boost and pump to re-apply type, a solenoid-operated cut-off valve is disposed between an expander piston and a brake, and the cut-off valve is operable independently of and separately from the expander piston. The cut-off valve co-operates with a one-way valve disposed between a master cylinder and the brake to hold the one-way valve in an open position when the cut-off valve is in a closed position with the solenoid de-energized. This ensures that the one-way valve can close only as a result of movement of the cut-off valve into an open position which can occur only when the solenoid is energized in response to a skid signal.

9 Claims, 6 Drawing Figures

ANTI-SKID HYDRAULIC BRAKING SYSTEMS FOR VEHICLES

This invention relates to anti-skid hydraulic braking systems for vehicles of the kind in which the supply of operating fluid from a supply to a vehicle brake is modulated by a modulator assembly in accordance with skid signals from skid sensing means, the modulator assembly comprising a housing incorporating a normally open one-way valve through which the operating fluid is supplied to the brake and which is movable into a closed position to isolate the supply from the brake when a skid signal is operative, an expander piston operable in sequence with the one-way valve and movable between an advanced position in which the effective volume of an expansion chamber leading to the brake is at a minimum when the one-way valve is open and a retracted position in which the effective volume of the chamber is increased to relieve the pressure applied to the brake following movement of the one-way valve into the closed position, a pump operative to effect re-application of the brake following correction of the skid, and a flow-control regulator valve for controlling the rate of brake re-application following correction of the skid with the one-way valve closed.

In some known braking systems of the kind set forth, for example as disclosed in GB-A-No. 2 090 929, the expander piston controls the one-way valve and the flow-control valve, and the position of the expander piston is in turn determined by a cut-off valve, the cut-off valve being normally closed, but being adapted to open in response to a skid signal to enable the expander piston to move away from its advanced position, in turn causing the one-way valve to close.

In such known braking systems, should leakage occur through the cut-off valve when in its closed position, then the expander piston can move in a direction to permit the one-way valve to close and the brake can then be applied but only at a rate permitted by the flow-control valve.

According to our invention in an anti-skid hydraulic braking system of the kind set forth, a cut-off valve responsive to a skid signal is disposed between the expander chamber and the brake, and the cut-off valve is operable independently of and separately from the expander piston, the cut-off valve co-operating with the one-way valve to hold the one-way valve in an open position when the cut-off valve is in a closed position with means responsive to a skid signal inoperative.

This ensures that the one-way valve can close only as a result of movement of the cut-off valve into an open position which can occur only when the means are actuated in response to a skid signal. Since the one-way valve is operable in sequence with the cut-off valve, any leakage through the cut-off valve when in the closed position will not cause or permit premature closure of the one-way valve.

Preferably the cut off valve is solenoid-operated and the solenoid is adapted to be energised in response to a skid signal.

Conveniently a single acting solenoid can be utilised to close the one-way valve and open the cut-off valve when energised in response to a skid signal, and upon de-energisation of the solenoid the cut-off valve is closed but the one-way valve remains closed until the pressure applied to the brake is again substantially equal to that of the supply of operating fluid. This is achieved by arranging for the seat of the one-way valve to be movable upon energisation of the solenoid into such a position that a valve member for engagement with the seat cannot be urged away from the seat when the cut-off valve closes at the termination of a skid signal. Conveniently the seat is incorporated in a spool which is movable in a bore to define the flow-control regulator valve with the position of the spool, and in consequence the seat, being determined by a pressure drop across a fixed orifice between the supply of operating fluid and the brake.

Preferably the expander piston and a plunger for the pump both work in a common bore in the housing and in the advanced position the expander piston co-operates with the plunger to hold the plunger out of co-operation with a drive mechanism for the pump whereby to disable the pump. Movement of the expander piston into its retracted position enables the plunger to co-operate with the drive mechanism whereby pumping of fluid takes place with fluid being withdrawn from the expander chamber through a first one-way valve during an induction stroke and being pumped into a passage between the supply of operating fluid and the flow-control regulating valve through a second one-way valve during a power stroke.

The expander piston is urged towards the plunger by means of a compression spring. When the plunger is operated by the drive by means of a separate piston-rod working through a bore in the expander piston, the compression spring abuts against a shoulder on the housing at one end of the bore, and the plunger is biassed in the opposite direction by a light spring abutting against a shoulder at the opposite end of the bore. When the plunger, itself, works through the bore in the expander piston, the compression spring is caged between the expander piston and an abutment on the plunger, and the light spring acts between the housing and the plunger to urge the plunger out of engagement with the drive mechanism.

More than one wheel can be controlled in one inlet line from a common supply of operating fluid supply by the addition of a corresponding number of assemblies, each comprising a solenoid-operated cut-off valve, a one-way valve, and a flow regulator valve.

Some embodiments of our invention are illustrated in the accompanying drawings in which.

Figure 1:
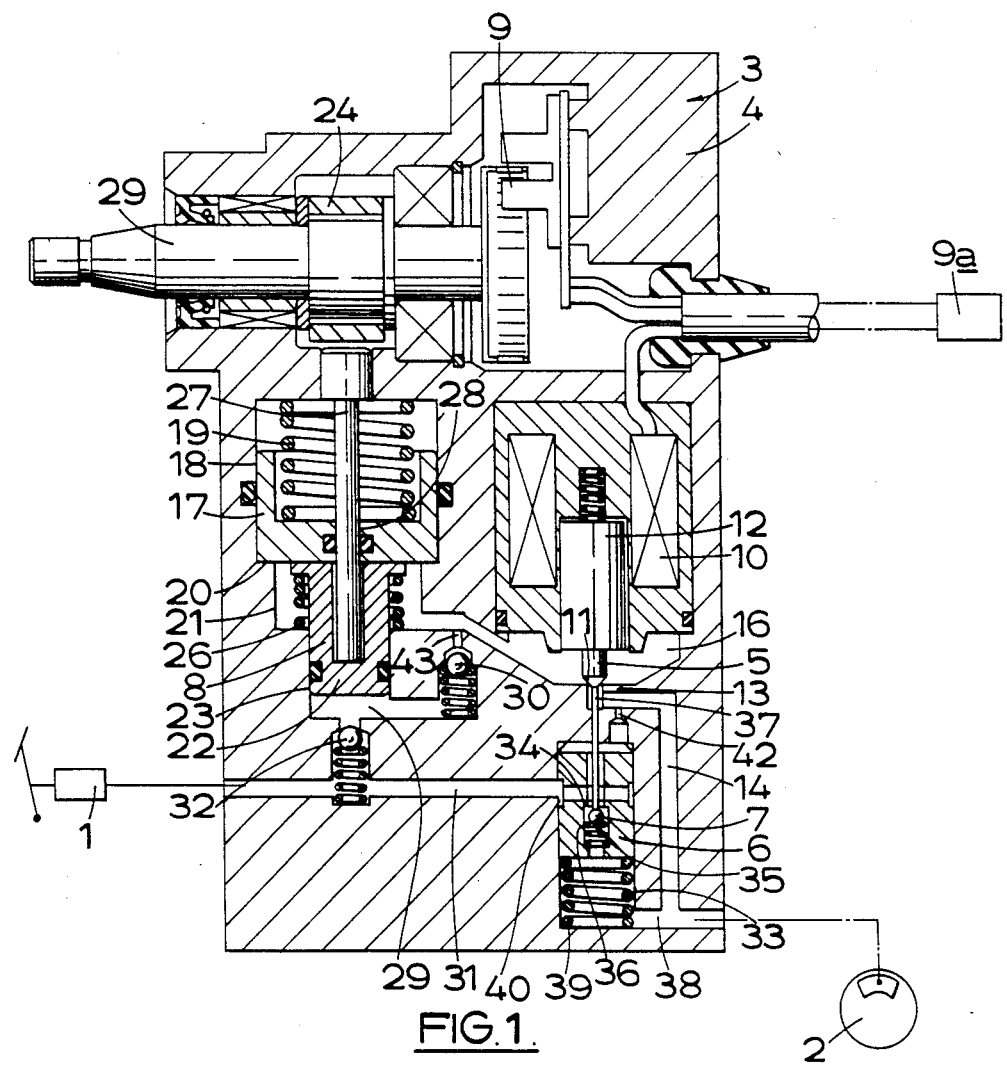
FIG. 1 is a layout of an anti-skid hydraulic braking system for a vehicle.

The anti-skid braking system illustrated in FIG. 1 of the drawings comprises a pedal-operated hydraulic master cylinder 1 for operating a wheel brake 2 and a modulator 3.

The modulator 3 comprises a housing 4 in which is incorporated a solenoid-operated cut-off valve 5, a flow regulator valve 6, a one-way valve 7, a pump 8, and a skid sensing mechanism 9 for producing an electrical skid signal which is supplied to a control module 9a and which, in turn, provides an electrical current to energise the solenoid 10 of the cut-off valve 5.

The solenoid-operated cut-off valve 5 comprises a valve head 11 which is carried by an armature 12 and which is normally urged into engagement with a seating 13 between a passage 14 leading to the brake 2 and an expander chamber 16 by means of a spring. The chamber 16 constitutes a reservoir for the pump 8 and is closed at its upper end by an expander piston 17 working in the portion 18 of a bore of stepped outline which is of largest diameter. Normally a compression spring 19 urges the expander piston 17 into an advanced position in which the effective volume of the expander chamber 16 is at a minimum and in which the piston 17 co-operates with a shoulder 20 at a step in diameter between the bore portion 18 and a portion 21 of intermediate diameter.

The pump 8 comprises a plunger 22 which works in the portion 23 of the stepped bore which is of smallest diameter. The plunger 22 is driven in one direction during a power stroke by an eccentric cam 24 on a drive shaft 25 for the wheel, and in the opposite direction, during an induction stroke, by a bias spring 26. The cam 24 acts on plunger 22 through a push-rod 27 which works through a bore 28 in the expander piston. During the induction stroke fluid is drawn from the chamber 16 and into a pumping chamber 29 at the outer end of the stepped bore through a one-way inlet valve 30, and during the power stroke fluid is discharged from the chamber 19 and into a passage 31 between the master cylinder 1 and the flow control regulator valve 6 through a one-way outlet valve 32.

The flow-control regulating valve 6 comprises a spool working in a bore 33 with the one-way valve 7 incorporated in it. The one way valve 7 comprises a seat 34 in the spool, and a valve member in the form of a ball 35 which is urged towards the seat 34 by a spring 36 but which is adapted to be held away from the seat 34 by an axial probe 37 projecting from the head 11 of the cut-off valve 5. In such a position the passage 31 has an unrestricted communication with the brake through the spool and a second passage 38 connected to the passage 14. The spool 6 is normally urged towards the inner end of the bore 33 by means of a spring 39. In this position a variable orifice defined by the end of the passage 31, and an annular recess 40 at the outer ends of a diametral passage 41 in the spool is at its greatest area. The upper edge of the recess 40 defines a metering edge. An orifice 42 of fixed area is provided at the inner end of the bore 33 between the bore 33 and the passage 14.

In the inoperative position shown the pump 8 is disabled with the push-rod 27 held out of engagement with the cam 24 by the engagement of the expander piston 17 with the plunger 22. The solenoid 10 is de-energised and the cut-off valve 5 is held in a closed position by the spring acting on the armature. The spool is held against the inner end of the bore 33 so that the seating 34 is held away from the ball 35 against the probe 37 to permit free and unrestricted communication between the master cylinder and the brake 2 through the one-way valve 7.

When the brake is applied, fluid is supplied from the master cylinder to the brake through the variable orifice which is at its maximum setting, and through the open one-way valve 7.

When a skid signal is emitted, the solenoid 10 is energised and the armature is withdrawn against the force in its spring to open the cut-off valve 5 and permit the one-way valve 7 to close. Closure of the one-way valve 7 isolates the master cylinder 1 from the brake 2, and the pressure from the master cylinder 1 urges the spool 6 relatively away from the fixed orifice 42 against the load in the spring 39 until the spool moves down and the metering edge meets a port defined by the adjacent end of the passage 31. At the same time pressure in the line to the brake 2 flows into the expansion chamber 16 through the open cut-off valve 5 to move the expander piston 17 relatively towards the cam 24 against the force in the spring 19. This enables the push-rod 27 to engage with the cam 24 and the pump 7 is operable to withdraw fluid from the expander chamber 16 through the inlet valve 30 and pump it into the passage 31 through the outlet valve 32 as described above. The reciprocating movement of the plunger 22 is limited by the throw of the cam 24.

Whilst the skid signal is being emitted, the master cylinder 1 continues to supply fluid to the brake 2 but at a restricted rate determined by the setting of the variable orifice in the flow-control regulating valve 6, namely the co-operation of the metering edge with the port at the end of the passage 31, and the fixed orifice 42. Flow from the master cylinder 1 to the brake 2 is substantially matched by a constant flow into the pumping chamber 29 resulting in a constant output from the pump 8 to the master cylinder 1.

The pump 8 is strangled to give a constant output above a predetermined speed of rotation of the shaft 25. This is achieved by providing an orifice 43 on the upstream side of the inlet valve 30 and through which fluid is withdrawn from the reservoir 16 during the induction stroke of the pump 8.

At the termination of the skid signal, the solenoid 10 is de-energised and the spring acts to urge the armature 12 in a direction, in turn to urge the head 11 into engagement with the seating 13, thereby closing the cut-off valve 5. Since the spool of the flow-control regulating valve 6 is in "down" position with the seat 34 in an equivalent position, the one-way valve 7 cannot re-open. The flow-control regulating valve 6 remains in the metering mode at which restricted rate the pressure applied to the brake 2 through the passages 14 and 38 is increased.

Since the cut-off valve 5 is closed, the output from the pump 8, which is returned to the master cylinder 1, reduces as fluid withdrawn from the reservoir 16 is no longer replenished from the brake 2 and the expander piston 17 moves relatively towards the shoulder 20 due to the force in the compression spring 19 until the shoulder 20 is engaged at which point the pump 8 is disabled with the push-rod 27 held out of engagement with the eccentric cam 24 as described above.

As the pressure applied to the brake 2 rises, second or subsequent skid signals may be emitted whereafter the sequence described above is repeated. During such second or subsequent skid signals the one-way valve 7 remains closed.

Following correction of a skid the one-way valve 7 only opens when the pressure applied to the brake 2 is substantially equal to output pressure from the master cylinder 1. Normally this can occur only when:

(a) the driver releases the pedal of the master cylinder 1; or (b) the vehicle travels over a surface having a coefficient of friction such that the pressure applied by the master cylinder 1 is insufficient to cause a skid.

Figure 2:
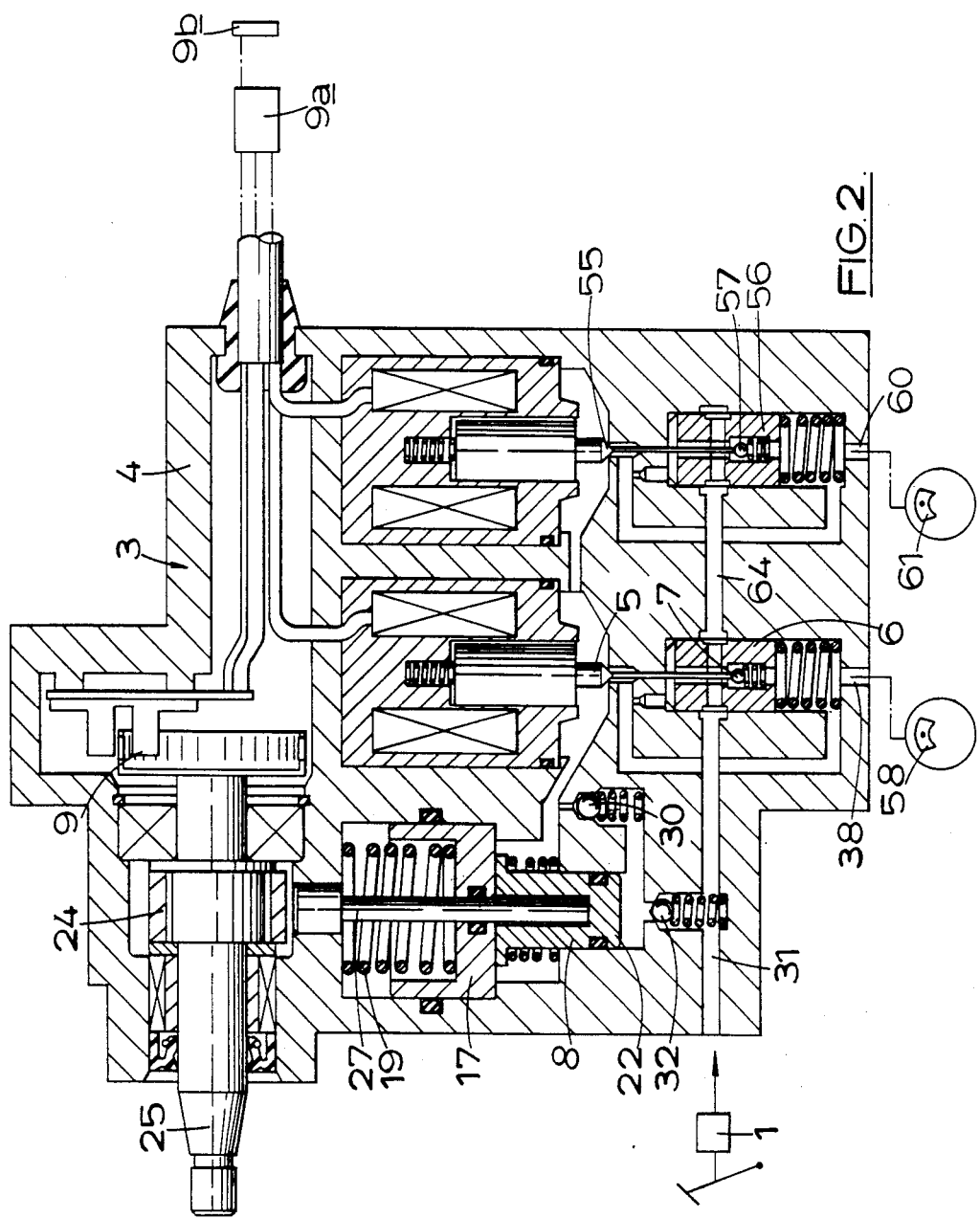
FIG. 2 is a layout similar to FIG. 1 but including a different modulator.

In the layout of FIG. 2 of the drawings the modulator 3 is modified to modulate the supply of fluid to more than one brake, or to more than one set of brakes, independently of each other.

As illustrated in FIG. 2 of the drawings a second solenoid-operated cut-off valve 55, a second flow-control regulator valve 56, and a second one-way valve 57 of similar construction to the valves 5, 6 and 7 are incorporated in the housing 4. The outlet passage 38 from the solenoid-operated valve 5 and the flow control regulator valve 6 are connected to a brake 58 on one of the front wheels of a vehicle, and an outlet passage 60 from the solenoid-operated valve 55 and the regulator valve 56 are connected to a brake 61 on one of the rear wheels of a vehicle. A passage 64 interconnects the two flow regulator valves 6 and 56 so that they are connected in parallel with the passage 31 from the master cylinder 1, and the expander chamber 16 is increased in size so that the solenoid-operated cut-off valve 55 also provides communication between it and the brake 61.

A skid sensing mechanism 9b senses the speed of rotation of the rear wheel 61 and any skid signal which it emits is supplied to the control module 9a which, in turn, produces an electrical current to energise the solenoid of the valve 55 in a similar manner to energisation of the solenoid of the valve 5, in the event of a skid signal being emitted by the skid sensing mechanism 9.

When the master cylinder 1 is operated to apply all four brakes normally, the two solenoid-operated cut-off valves 5 and 55 are shut, and both one-way valves 7 and 57 are held open. The fluid from the master cylinder 1 is therefore supplied to the two brakes 58 and 61 through the passages 31 and 64, and 38 and 60.

When a skid signal is emitted by one of the wheels, say by one the front wheel 58, the solenoid-operated cut-off valve 5 opens, and the one-way valve 6 closes. The fluid from the brake 58 is displaced to the reservoir chamber 16, and the pump 8 is brought into operation ready to initiate brake re-application as described above.

Provided no skid signal is emitted by the rear wheel brakes 61 it will continue to be applied by the master cylinder 1, with fluid being supplied through the passages 31 and 36, and the open one-way valve 57.

When the skid signal is emitted by the rear wheel brake 61 and the front wheel brake is being applied normally, the pressure applied to the rear wheel brake 61 is modulated by the flow-control regulator valve 56, in similar manner to the way the pressure applied to the front wheel is modulated by the valve 5 and 6.

In the layout of FIG. 2 the output from the pump 8 is matched to the requirements of both brakes.

Figure 3:
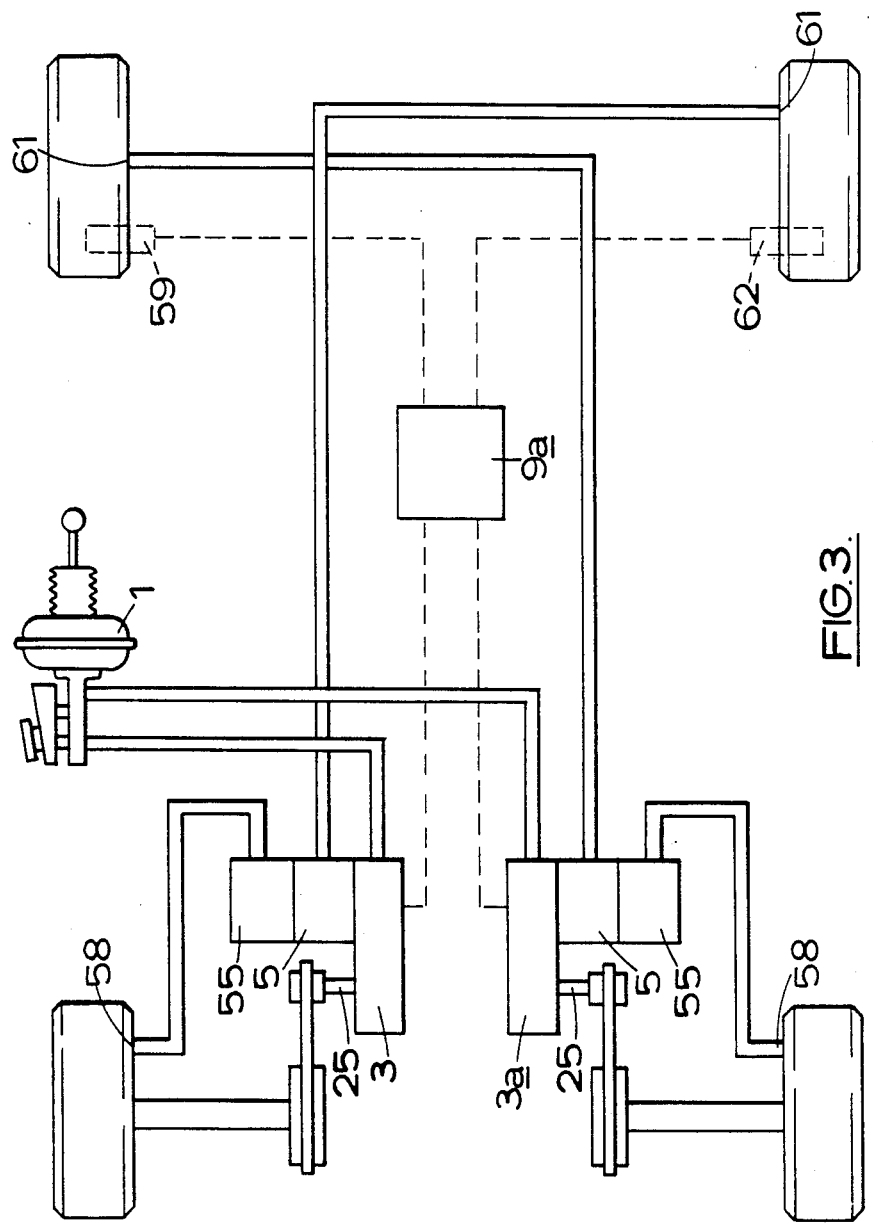
FIG. 3 is a schematic layout of another braking system.

FIG. 3 shows two modulators 3, 3a of FIG. 2 located in a vehicle with an "X" split, braking system. One circuit of the master cylinder 1 acts as an input to one modulator, and the other circuit acts as an input to the other modulator 3a. The two outlets from the respective valves 5 and 55 supply fluid to the brake on one front wheel and on the diagonally opposite rear wheel.

The drive to camshafts 25 of both modulators is conveniently taken from the transmission drives to each front wheel. The camshafts 25 also drive the front wheel sensors as described. Rear wheel sensors 59, 62 are separate and would normally be of a magnetic type.

This system permits a brake on a front wheel and its diagonally opposite rear wheel to be controlled by a modulator 3, 3a which takes its power drive from one front wheel. Similarly in a rear wheel drive car, the modulators 3, 3a can be driven by the rear wheels and front magnetic sensors similar to 59 and 62 would be used for the front wheels. Alternatively the drive to the pumps of the modulator may be taken from the propshaft drive to the rear wheels. In this case only one rear wheel sensor would be required, conveniently built into a tandem modulator, and the front wheels would again have separate sensors.

Figure 4:
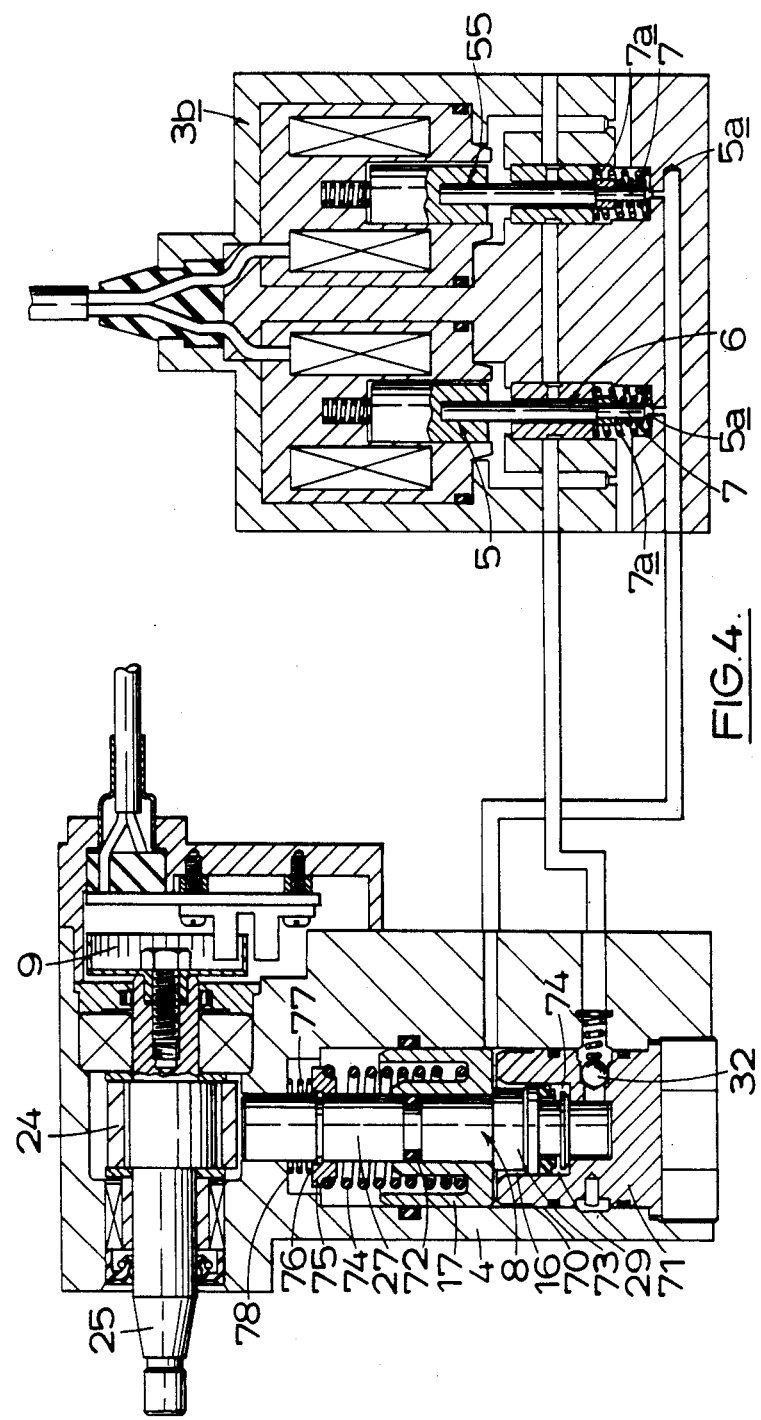
FIG. 4 is a layout similar to FIG. 2 including a modulator.

The pump 8 incorporated in the modulator 3 of FIGS. 1 and 2 can be of a simplified construction as shown in FIG. 4, formed as a unit for use with one or more solenoid-operated valves 5, 55, housed in a separate body 3b.

As illustrated in FIG. 4 the housing 4 has a bore 70 which is closed at its lower end of greater diameter by means of a plug 71. The stem 27 is of increased diameter and carries a seal 72 working through the bore 28 in the piston 17 and a head 73 of increased diameter working in a bore 74 in the inner end of the plug 71. The one-way valve 32 is housed in the plug 71. The piston 17 is urged into engagement with the inner end of the head 73 by means of a compression spring 74 of which the opposite end abuts against an abutment 75 on the stem 27. The abutment 75 comprises a collar which is slidably mounted on the stem 27, and abuts against a circlip 76 on the stem 27, and a light compression spring 77 acts between the opposite face of the abutment and a wall 78 at the inner end of the bore 70 and through an opening in which the stem 27 projects for engagement with the eccentric cam 24.

The stem 27 and the head 73 can be formed as subassembly for insertion through the open end of the bore 70, which can then be closed by the plug 71.

In the modified construction of FIG. 4, the compression spring 74 is normally caged between the abutment 75 and the piston 17 when the piston 17 is in engagement with the head. The light spring 77 acts to urge the stem 27 out of engagement with the cam 24 with the head 73 engaging with the inner end of the bore 74.

Housing the two solenoid valves 5, 55 in the separate body 3b considerably eases the installation on the vehicle.

Each solenoid valve is of slightly different construction. In this case the stem of the cut-off valve 5 passes through the flow control valve 6 and a cut-off valve head 5a is located below the flow control valve 6. The one-way valve 7 is of annular shape and has a head 7a which rests on a shoulder of the stem of the cut-off valve 5. In this construction in the pressure in the brake chamber holds the cut off valve 5 closed, whereas in the previous construction described above, the valve had to be spring-loaded closed against the force developed by the brake pressure.

When a skid signal is emitted and one or more solenoid-operated cut-off valves open to displace fluid to the reservoir 16, the piston 17 retracts, initially against the loading in the light spring 77 accompanied by an equivalent movement of the stem 27 and the head 73, and subsequently against the load in the compression spring 74 which is uncaged to permit reciprocation of the head 73 in the bore 74 to initiate pumping of fluid.

Figure 5:
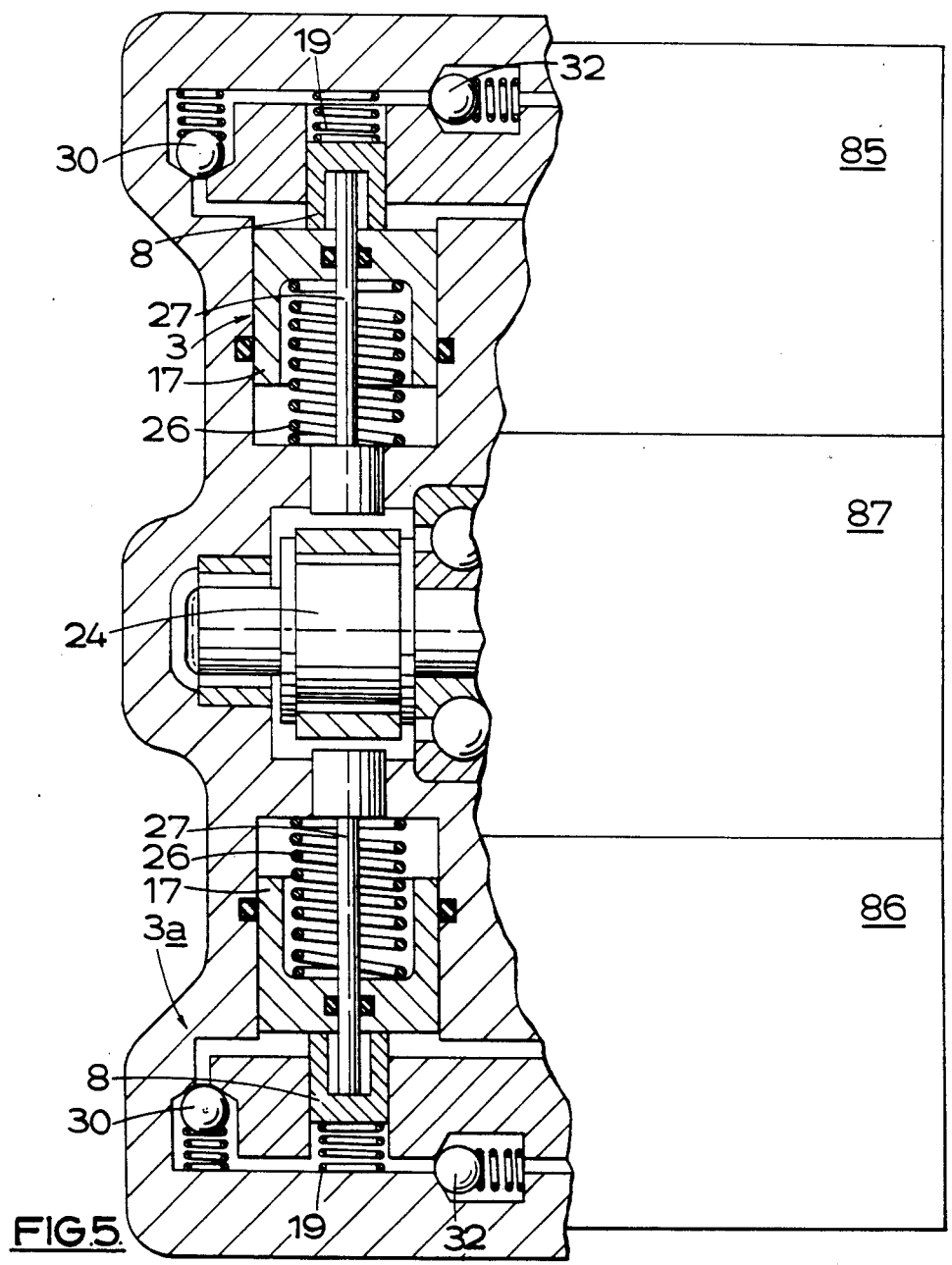
FIG. 5 is a section through another modulator.
Figure 6:
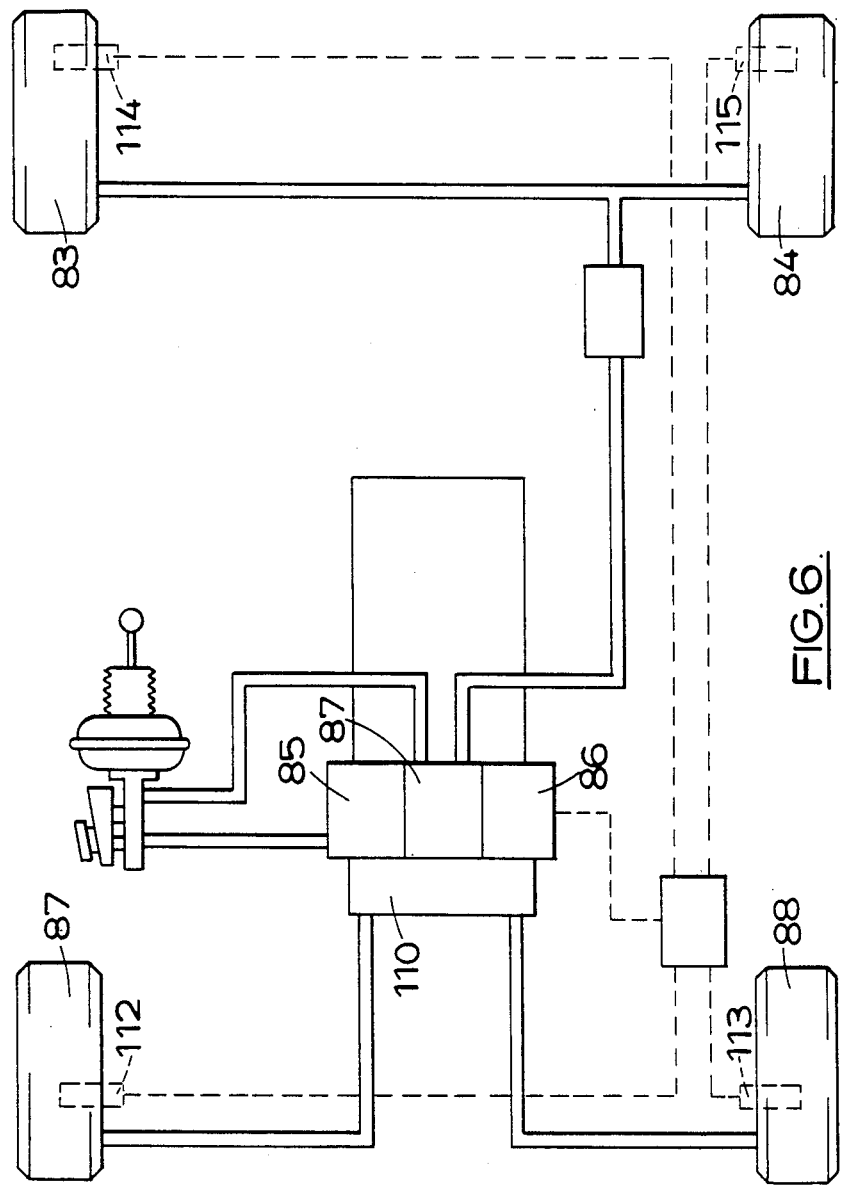
FIG. 6 is a schematic layout of yet another braking system incorporating the modulator of FIG. 5.

FIG. 5 and FIG. 6 illustrates a twin pump of the type shown in FIG. 1, in a layout of a front/rear split. In this case only one cam shaft 29a is used, and the cam shaft 29a is driven from a motor, rather than from a wheel of the vehicle. Three solenoid-operated cut-off valves and flow regulating valve 85, 86 and 87 are required, one 85, 86 for each front wheel and one 87 for the two rears. One of the pump pistons will pump back to the master cylinder line connected to both fronts and the other pump piston will pump back to the master cylinder line connected to both rears.

I claim:

1. An anti-skid hydraulic braking system for vehicles having a wheel and comprising a brake for the wheel, a supply of operating fluid for applying said brake, skid sensing means for sensing the behaviour of said wheel when braked and for emitting skid signals, and a modulator assembly for modulating the supply of operating fluid from said supply to said brake in accordance with a skid signal from said skid sensing means, wherein said modulator assembly comprises a housing incorporating means responsive to a skid signal, a normally open one-way valve through which said operating fluid is supplied to said brake and which is movable from a normally open position into a closed position to isolate said supply from said brake when a skid signal is operative, an expander piston operable in sequence with said one-way valve and movable between an advanced position in which the effective volume of an expansion chamber leading to said brake is at a minimum when said one-way valve is open and a retracted position in which the effective volume of said chamber is increased to relieve the pressure applied to said brake following movement of said one-way valve into said closed position, a pump incorporating a plunger separate from said expander piston and operative to effect re-application of said brake following correction of said skid, and a flow-control regulator valve for controlling the rate of brake re-application following correction of said skid with said one-way valve in said closed position, and wherein a cut-off valve responsive to a skid signal is disposed between said expander chamber and said brake, and said cut-off valve is operable independently of and separately from said expander piston, said cut-off valve co-operating with said one-way valve to hold said one-way valve in an open position when said cut-off valve is in a closed position with said means responsive to a skid signal inoperative.

2. A system as claimed in claim 1, wherein said cut-off valve is solenoid-operated and said solenoid is adapted to be energised in response to a skid signal.

3. A system as claimed in claim 2, wherein a single acting solenoid is utilised to close said one-way valve and open said cut-off valve when energised in response to a skid signal, and upon de-energisation of said solenoid said cut-off valve is closed but said one-way valve remains closed until the pressure applied to said brake is again substantially equal to that of the supply of operating fluid.

4. A system as claimed in claim 3, wherein said the one-way valve comprises a seat, and a valve member adapted to co-operate with said seat, and said seat of said one-way valve is movable upon energisation of said solenoid into such a position that said valve member cannot be urged away from said seat when said cut-off valve closes at the termination of a skid signal.

5. A system as claimed in claim 4, wherein said seat is incorporated in a spool, and a fixed orifice is disposed between said supply of operating fluid and said brake, said spool being movable in a bore to define said flow-control regulator valve with the position of said spool, and in consequence said seat, being determined by a pressure drop across said fixed orifice.

6. A system as claimed in claim 1, incorporating a drive mechanism for said pump, wherein said expander piston and a plunger for said pump both work in a common bore in said housing and in said advanced position said expander piston co-operates with said plunger to hold said plunger out of co-operation with said drive mechanism, whereby to disable said pump, movement of said expander piston into said retracted position enabling said plunger to co-operate with said drive mechanism whereby pumping of fluid takes place with fluid being withdrawn from said expander chamber through a first one-way valve during an induction stroke and being pumped into a passage between said supply of operating fluid and said flow-control regulating valve through a second one-way valve during a power stroke.

7. A system as claimed in claim 6, wherein a compression spring urges said expander piston towards said plunger.

8. A system as claimed in claim 7, wherein said expander piston has a bore and said plunger is operated by said drive by means of a separate piston-rod working through said bore in said expander piston, and said compression spring abuts against a shoulder on said housing at one end of said bore, a light compression spring adapted to bias said plunger in the opposite direction, said light spring abutting against a shoulder at the opposite end of said bore.

9. A system as claimed in claim 8, wherein said plunger, itself, works through said bore in said expander piston, said compression spring is caged between the expander piston and an abutment on said plunger, and said light spring acts between said housing and said plunger to urge said plunger out of engagement with said drive mechanism.

* * * * *